(12) United States Patent
Thomas

(10) Patent No.: US 6,363,430 B1
(45) Date of Patent: Mar. 26, 2002

(54) METHODS AND SYSTEMS FOR PROVIDING AN ABSENT ADDRESSING SERVICE TO CUSTOMERS IN A COMMUNICATIONS NETWORK

(75) Inventor: Michael Flynn Thomas, Plano, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/176,484

(22) Filed: Oct. 21, 1998

(51) Int. Cl.[7] ............................................... G06F 15/16
(52) U.S. Cl. ........................ 709/245; 709/206; 455/417
(58) Field of Search ................................ 705/206, 245; 455/417

(56) References Cited

U.S. PATENT DOCUMENTS

| | | | |
|---|---|---|---|
| 5,243,645 A | * 9/1993 | Bissell et al. | 379/211 |
| 5,428,663 A | * 6/1995 | Grimes et al. | 455/31.2 |
| 5,920,812 A | * 7/1999 | Palviainen | 455/417 |
| 6,085,231 A | * 7/2000 | Agraharam et al. | 709/206 |
| 6,134,433 A | * 10/2000 | Joong et al. | 455/417 |

* cited by examiner

Primary Examiner—Krisna Lim
(74) Attorney, Agent, or Firm—Carr & Storm, L.L.P.

(57) ABSTRACT

Disclosed is an apparatus for providing an absent addressing service (i.e. call forwarding, voice messaging, and the like) for subscribers normally connected to a H.323 compliant network. Some network entity, such as a subscriber's gatekeeper, intercepts all set-up calls to subscribers requiring such a service. If the subscriber is properly registered, the set-up call is forwarded to the subscriber. Otherwise messages are delivered, in accordance with the configuration of the network gatekeeper, whereby the calling party becomes connected to an absent addressing service rather than the originally called terminal of the subscriber.

16 Claims, 4 Drawing Sheets

METHODS AND SYSTEMS FOR PROVIDING AN ABSENT ADDRESSING SERVICE TO CUSTOMERS IN A COMMUNICATIONS NETWORK

TECHNICAL FIELD OF THE INVENTION

The present invention relates in general to networks and in particular to methods and systems for providing absent subscriber addressing service.

BACKGROUND OF THE INVENTION

The Internet comprises an interconnected set of networks where the individual networks may use various protocols within a specific network but which use standardized Internet protocols (IP) for communicating with other networks.

While the Internet started with the idea of transmitting only text, the protocol has expanded to many types of media including voice, video and other graphics. The communication is in the form of packets of data and thus there is no solid or fixed connection as is the case with the public switched telephone network system (PSTN). In general, when an Internet user wants to communicate with another user, the sending party transmits a message to the Internet service provider (ISP) of the recipient. The recipient obtains the communication when he next accesses the ISP and requests any previously unreceived messages. Two way communication of either voice or text has previously required an advance arrangement on the part of both the sending party and the recipient to be accessing the Internet and using the appropriate protocol.

In an attempt to simplify Internet communication problems, various standards have been formulated and adopted in the industry. These standards are followed when designing new hardware and software. An example is H.323 entitled "PACKET BASED MULTIMEDIA COMMUNICATIONS SYSTEMS" which is incorporated herein by reference. Standard H.323 covers the technical requirements for multimedia communications systems in those situations where the underlying transport is a packet based network (PBN) which may not provide a guaranteed quality of service (QoS). The H.323 standard covers not only calls between H.323 compliant terminals in remotely located H.323 compliant networks, but also covers calls between such terminals and telephones in switched circuit systems such as the PSTN. For the purposes of this invention, a call is defined as a multimedia communication between two terminals at least one of which is H.323 compliant.

The call may comprise the use of a collection of channels between terminal endpoints, some of which channels may be "unreliable". A "reliable" channel uses a protocol that keeps track of the number and order of messages sent and received so that the receiving endpoint knows when data packets are missing or received out of order. An unreliable channel merely delivers message packets as well as it can, but requires the sending program to monitor whether messages are both received at the destination and received in the proper order. An unreliable channel will normally provide much faster communications of a given quantity of data than would a channel that must also continually communicate data tracking messages.

A call begins with a call set-up procedure and ends with a call termination procedure. Other examples of standards applicable to calls incorporating the Internet are H.225.0 entitled "CALL Signalling PROTOCOLS AND MEDIA STREAM PACKETIZATION FOR PACKET BASED MULTIMEDIA COMMUNICATIONS SYSTEMS", H.235 entitled "SECURITY AND ENCRYPTION FOR H SERIES (H.323 AND OTHER H.245 BASED) MULTIMEDIA TERMINALS" and H.245 entitled "CONTROL PROTOCOL FOR MULTIMEDIA COMMUNICATIONS". The H.225.0, H.235 and H.245 standards are also incorporated herein by reference.

To date, the standards and the industry practice have been directed to communications between users accessing terminals at known locations in their home network. While generally, users must check the network to see if any communications are being held for the user, systems exist that notify a user that there is mail in the mailbox when a user's terminal is turned ON. Further, if the user's terminal is already turned ON, a display or a speaker of a terminal can advise the user that a communication, whether electronic mail or a voice call, is being received. The H.323 standard referenced above includes voice and other multimedia calls set up and completed between a H.323 compliant terminal and another terminal where the recipient H.323 compliant terminal user is located in that users "home" network.

If a network terminal, such as a computer is turned OFF, it is considered to be "not connected to the network" even though it may be connected to the network by a physical wire. Many networks require the communication software of a connected terminal to re-register on a periodic basis to maintain a "registered" status. This periodic basis is termed in the art as "TIME TO LIVE" and may be of a duration as short as a period of minutes.

Although communication software has procedures for explicitly "unregistering" a terminal, such procedures are not reliable in that a terminal may be taken offline for various reasons. One such reason may be a power failure.

When a call is received by a network gatekeeper for a subscriber that is not presently registered or is otherwise unreachable, the network in the past has only been able to return a message to the requesting party that the subscriber is not available. If the network does not utilize a TIME TO LIVE procedure, or if the TIME TO LIVE is in the order of many minutes, the time before returning an "unreachability" message to the calling party may be extensive.

It would be beneficial to many subscribers to have a network supplied service that provides an alternate action when a given subscriber is absent or otherwise unavailable.

SUMMARY OF THE INVENTION

The present invention is directed to the method of and apparatus for providing an absent addressing service by a subscriber'gatekeeper

BRIEF DESCRIPTION OF THE DRAWINGS

For a more complete understanding of the present invention, and its advantages, reference will now be made in the following Detailed Description to the accompanying drawings, in which.

DETAILED DESCRIPTION OF THE INVENTION

Figure 1:
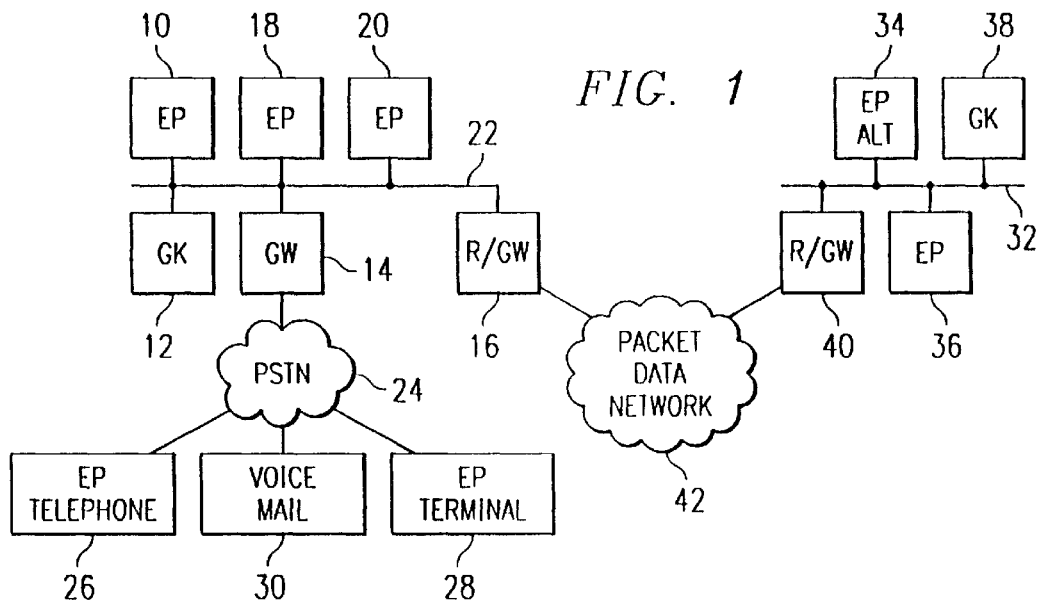
FIG. 1 is a block diagram of a packet data network incorporating the present invention.

In FIG. 1 an end point (EP) 10 is shown connected to a network having a gatekeeper 12, a gateway 14 and a router/gateway block 16. Additional end points 18 and 20 are also illustrated connected to a common communication link 22. Each of the blocks 10 through 16 are also connected to the common communication link 22. A public service telephone network (PSTN) is represented by a cloud designated as 24. PSTN 24 is connected to gateway 14. Two end point blocks 26 and 28 are shown connected to PSTN 24 as well as a voice mail block 30. A further network is shown having a common link 32. End point blocks 34 and 36 are shown connected to communication link 32. A gatekeeper 38 is also connected to link 32. A router/gateway 40 is connected between link 32 and a packet data network cloud 42. Cloud 42 is also connected to block 16. EP 26 is further designated as a telephone, EP 28 is further designated as a terminal and EP 34 is further designated as alternate.

Each may be used to received forwarded voice or other communications when a subscriber terminal is not registered on a network.

Figure 2:
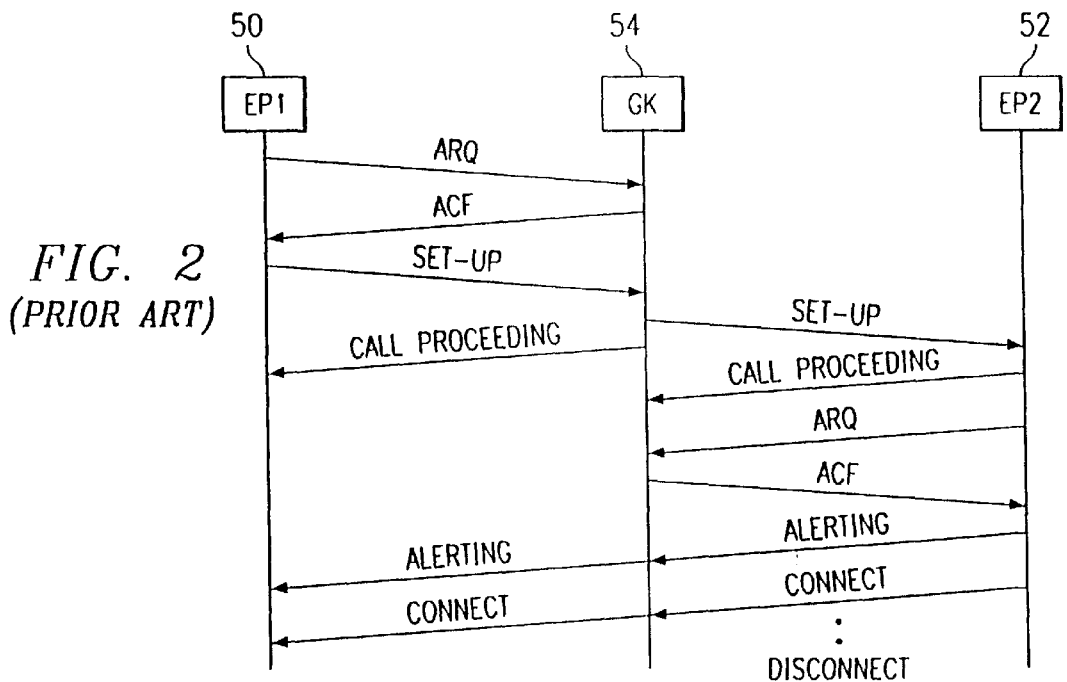
FIG. 2 illustrates, in a time sequence diagram form, a methodology of obtaining a connection in an H.323 compliant prior art network system where both endpoints (EPs) are registered with the same gatekeeper (GK)

In FIG. 2 two EP blocks 50 and 52 are shown at the top of a time sequence diagram with a GK block 54 between blocks 50 and 52. Blocks 50 and 52 may be considered to be representative of EPs 10 and 20 in FIG. 1 while block 54 may be considered representative of GK 12. The time sequence is that of a prior art call conforming to the H.323 protocol previously referenced where both EPs are registered, GK routed call signalling is utilized and RAS message types are used to establish the call. No details are shown for maintaining a connection once established or for disconnection messages upon termination of a communication as these are well known and detailed in the referenced standards.

As shown, EP 50 sends an admission request (ARQ) to GK 54 and receives an admission confirmation (ACF) if there is capacity available on the network. EP 50 sends a SET-UP message including the address for the called party or, in other words, EP 52 in this example. The SET-UP message is forwarded to the called party and a CALL PROCEEDING message is returned to the calling party EP 50. If EP 52 is not otherwise occupied and wishes to answer the call, it returns a CALL PROCEEDING message to GK 54. It then sends an ARQ to ascertain if there is still network capacity available and receives an ACF if there is. At this time EP 52 sends an ALERTING signal signifying that it is in the process of establishing a connection. The ALERTING signal is forwarded by the GK 54 to the calling party EP 50. A CONNECT message is then sent by EP 52 and forwarded by GK 54 to EP 50. At this time communication is established between the called and calling parties via the GK 54. Normal procedures are used to maintain the connection and to provide for disconnection at the appropriate time.

If a network were configured such that all signalling and/or traffic was not required to pass through the GK 54, some or all of the messages shown in FIG. 2 could be sent directly between EPs 50 and 52 once the calling party had an address for the called party.

Figure 3:
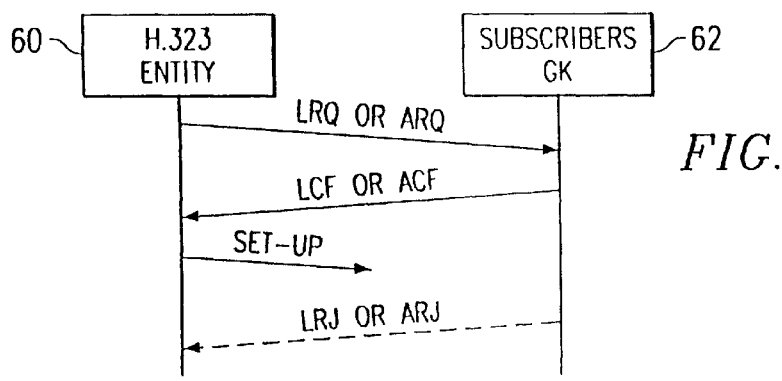
FIG. 3 illustrates, in a time sequence diagram form, an abbreviated methodology of action taken by a network subscribers gatekeeper in response to a received request in a registration, Admission and Status (RAS) based system.

In FIG. 3, a first block 60, representing any H.323 compliant entity, sends a request to a subscribers GK shown as block 62. It may be assumed that the GK 62 requires all signalling messages to pass through the GK. This requirement provides an interception point or intervening party to ascertain whether a called party is unregistered or otherwise unreachable. In that event, an alternate destination would be given incoming calls directed to said called party.

If the incoming request is a location request (LRQ), a location confirmation (LCF) is provided. The LCF includes an alias for the called party along with an address that the GK 62 will recognize as being attributable to the called party when it receives a SET-UP message. As shown, the incoming request may also be an admission request (ARQ) and the normal response would be an admission confirmation (ACF).

As shown in dash lines, GK 62 may return a location reject (LRJ) or a admission reject (ARJ) message if the alias does not correspond to a subscriber using that system and assigned to that GK. In this situation, a SET-UP message would not be sent by EP 60.

If the calling party already has the SET-UP message data or has just received same as the result of an LRQ, an ARQ will be sent and, upon receipt of an ACF, a SET-UP message will be sent to the subscribers gate keeper. The message passing actions shown in FIG. 3 are preliminary to and required prior to the messages represented by the time sequence action of each of the remaining FIGS. 4 through 7.

Each of the FIGS. 4 through 7 include an H.323 compliant block 70 representing a calling party, a subscriber GK block 72, a subscriber terminal block 74 and an absent addressing service (AAS) block 76. The blocks 70 and 74 may represent blocks 10 and 20 in FIG. 1 with block 72 representing block 12. The calling party could also be in another network and could be as an example EP 36. The block 76 may represent any of several blocks in FIG. 1 such as the voice mail block 30, a home or office telephone such as block 26, another terminal connected through PSTN 24 such as block 28 or an alternate EP on a different packet data network such as block 34.

The absent addressing service may be used in various manners such as to access a voice mail service, a messaging service, a call forwarding service, another H.323 entity, and call completion services. In the context of this invention, the term absent includes any condition wherein the customer cannot be contacted by the appropriate gatekeeper including the condition where a customer is presently communicating with another party or actively ignores an incoming call.

Figure 4:
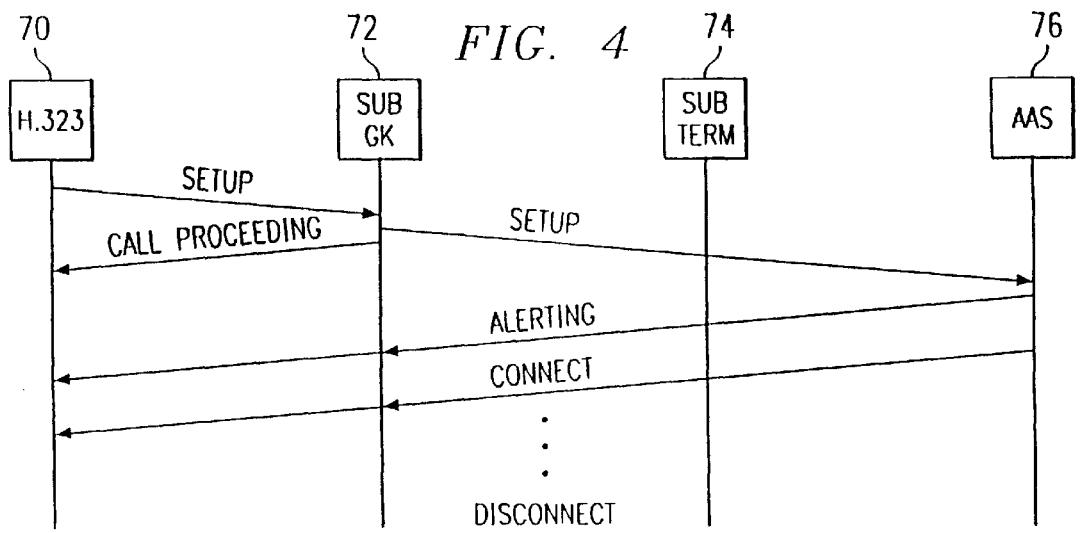
FIG. 4 illustrates, in a time sequence diagram form, a methodology of message flows in a GK routed call signalling based network where a subscriber is already deemed unreachable.
Figure 5:
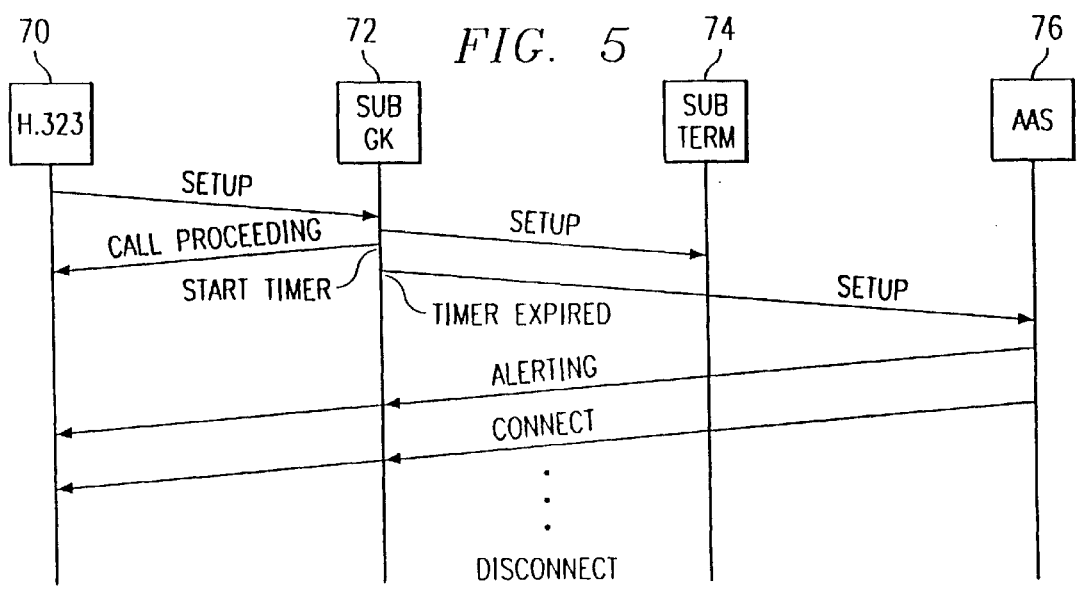
FIG. 5 illustrates, in a time sequence diagram form, a methodology of message flows in a GK routed call signalling based network where a subscriber has only recently become unreachable.

In FIGS. 4 and 5 it is assumed that the network is configured such that all calling signalling to AAS 76 is required to be passed through or under the control of GK 72.

In FIG. 4 a sequence of messages in shown wherein GK 72 is cognizant that subscriber 74 is absent or unreachable. This may be either because subscriber 74 is not registered, has successfully completed the unregistration procedure, or has failed to re-register within the required TIME TO LIVE. When GK 72 receives a SET-UP message for said absent subscriber, a SET-UP message is immediately sent to AAS 76 and then a CALL PROCEEDING message is returned to the calling party. ALERTING and CONNECT messages are returned from AAS 76 to GK 72 and passed to calling party 70 and the call proceeds in an established manner through disconnect.

In FIG. 5, a sequence of messages in shown wherein GK 72 data stored within GK 72 would show that subscriber 74 is still registered and thus available. When GK 72 receives a SET-UP message from calling party 70, a SET-UP message is sent to subscriber 74 and then a CALL PROCEEDING message is returned to the calling party. Immediately thereafter, a call establishment timer is started. If a response is obtained from subscriber 74 before the timer expires, the call proceeds in a normal manner similar to that shown in FIG. 2. If however, the timer expires without any return message from subscriber 74, a further SET-UP message to sent to AAS 76 as shown. ALERTING and CONNECT messages are returned from AAS 76 to GK 72 and passed to calling party 70 in the manner shown in connection with FIG. 4. The call then proceeds in an established manner through disconnect.

Figure 6:
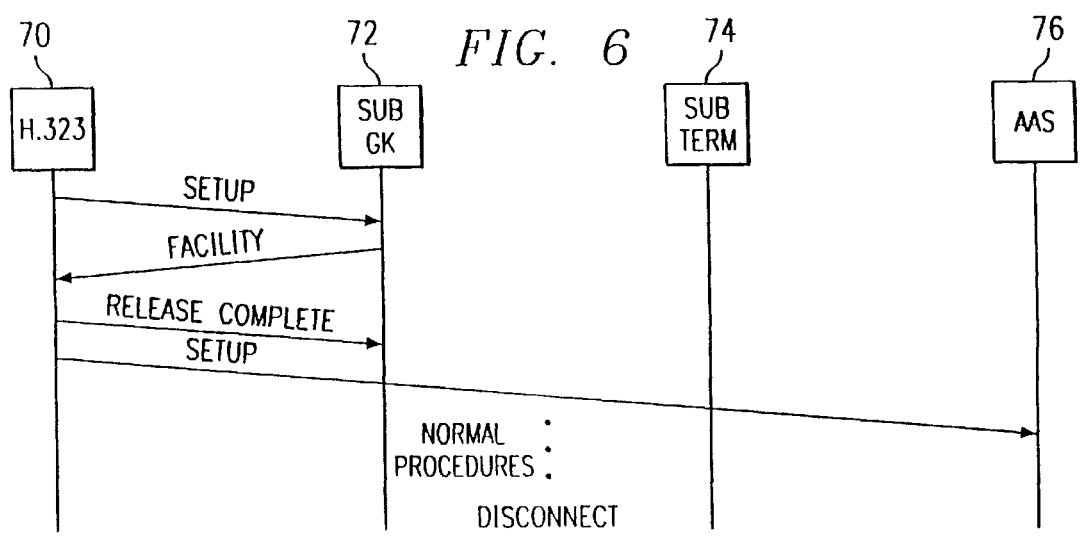
FIG. 6 illustrates, in a time sequence diagram form, a methodology of message flows in a direct call signalling based network where a subscriber is already deemed unreachable.
Figure 7:
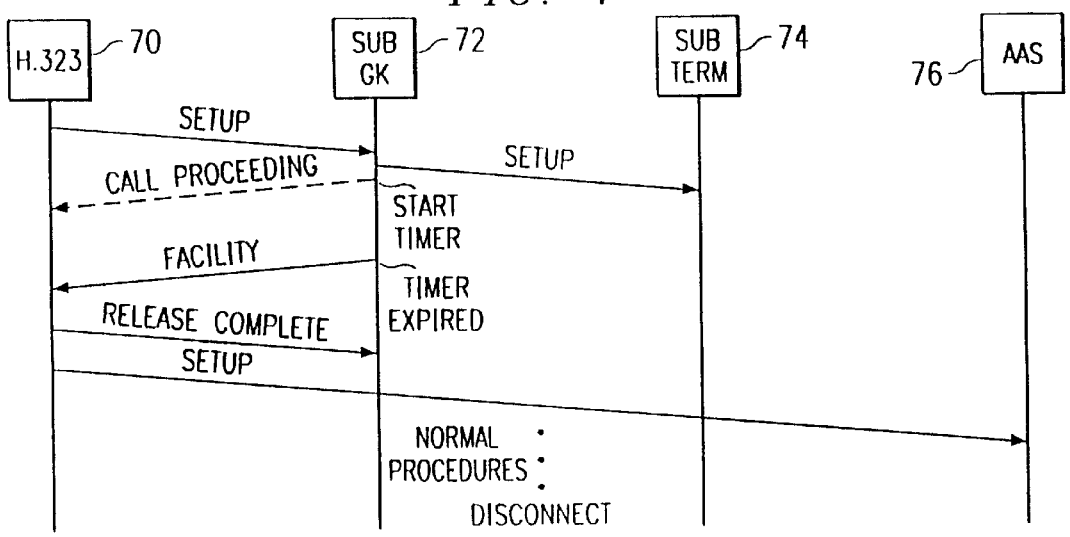
FIG. 7 illustrates, in a time sequence diagram form, a methodology of message flows in a direct call signalling based network where a subscriber has only recently become unreachable.

In FIGS. 6 and 7 it is assumed that the network is configured such that calling signalling to AAS 76 does not need to be passed through or under the control of GK 72.

In FIG. 6 a sequence of messages in shown wherein GK 72 is cognizant that subscriber 74 is absent or unreachable as assumed in connection with FIG. 4. When GK 72 receives a SET-UP message for said absent subscriber, a FACILITY message is returned to calling party block 70. The FACILITY message includes the subscriber alias and the address of block AAS 76. A RELEASE COMPLETE message is also sent from GK 72 to the calling party to advise EP 70 that communications with GK 72 have been completed and that EP 70 may commence its next set of messages with another entity. In this situation, calling party block 70 sends a second SET-UP message as shown directly to AAS 76 and the call proceeds normally according to H.323 standards until disconnect.

In FIG. 7, a sequence of messages is shown wherein data stored within GK 72 would show that subscriber 74 is still registered and thus available. When GK 72 receives a SET-UP message from calling party 70, a SET-UP message is sent to subscriber 74. In this situation, it is optional with the GK as to whether or not to return a CALL PROCEEDING message to the calling party 70. Immediately after the SET-UP message is sent to subscriber 74, a call establishment timer is started. A RELEASE COMPLETE message is also sent from the calling party, shown as EP 70 to GK 72 to indicate the FACILITY message has been received and to release the signaling connection between EP 70 and GK 72. If however, the timer expires without any return message from subscriber 74, a FACILITY message is returned to calling party block 70 in the manner of FIG. 6. EP 70 then commences with establishing call signalling to the party indicated in the FACILITY message. The calling party 70 therefor sends a SET-UP message directly to AAS 76 and the call proceeds in a normal H.323 compliant manner to disconnect.

Figure 8:
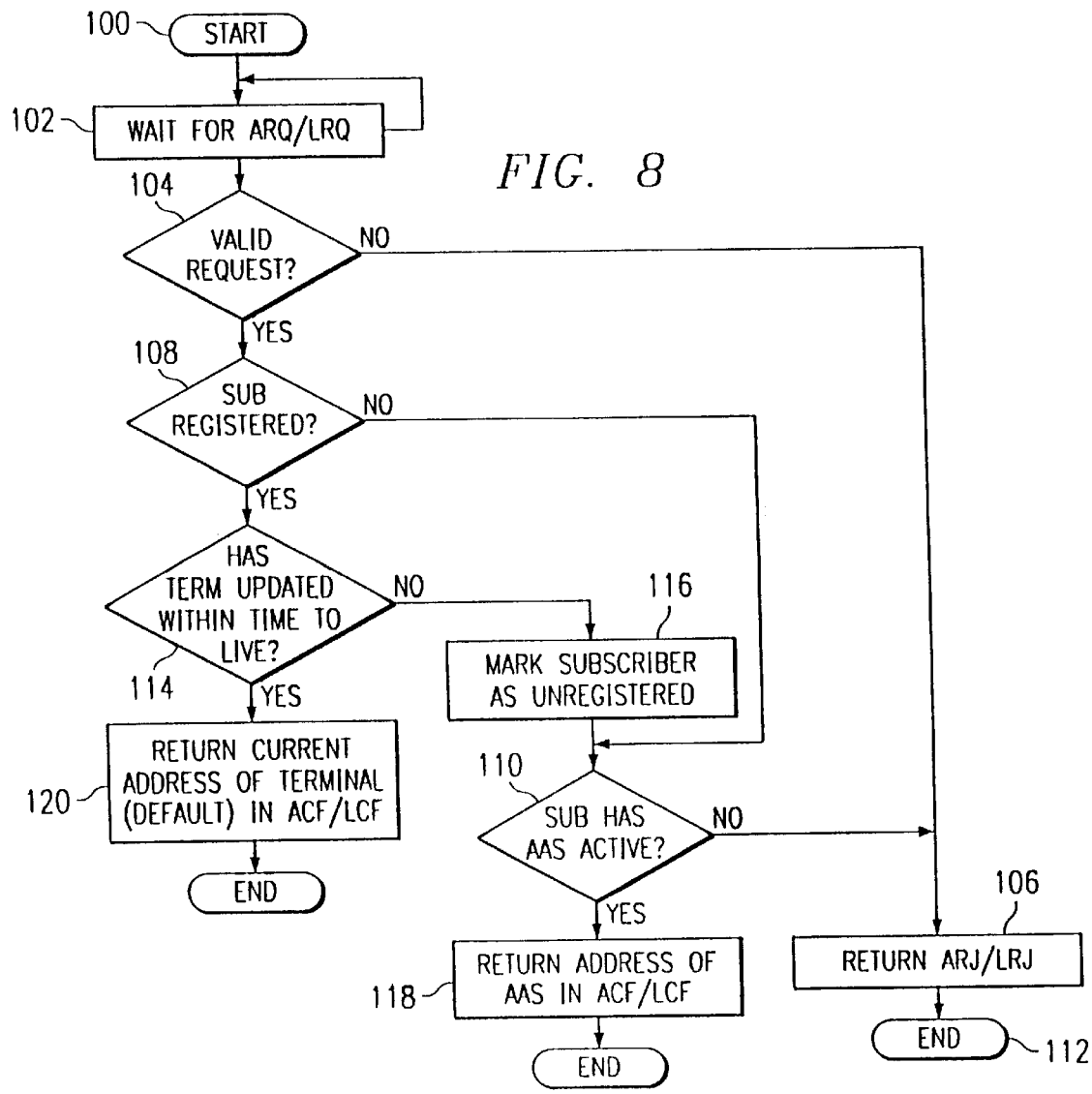
FIG. 8 comprises a flow chart used in further explaining the operation of the invention for RAS based signalling in a subscriber's network.

The flow diagram of FIG. 8 presents the logic flow used in the system to obtain the sequence of messages presented in the RAS based signalling system represented by FIGS. 3 through 5. The system waits for the appearance of an ARQ or an LRQ as shown by block 102. This action is shown by the receipt of the ARQ or LRQ message by block 62 in FIG. 3. A decision block 104 checks to see if the request is valid. The GK must have a subscriber listed in that gatekeepers data banks with the alias used in the ARQ or LRQ for the request to be valid. If the request is not valid, the system, as shown in block 106, returns a ARJ or LRJ message and ends the process or in other words starts over and thus returns to block 102 to wait for another message. If the message is valid, the process proceeds to decision block 108 to ascertain whether or not the subscriber is registered. As used herein, registered means that the subscriber has, within some predefined recent time, made known to the subscribers GK that the subscribers terminal is still actively connected to the system. If the subscriber is not presently actively connected, the system proceeds to decision block 110 where the logical entity checks to see whether or not the requested subscriber has absent addressing service (AAS). If that subscriber does not presently have an AAS, the system proceeds to block 106 and from there to wait for another incoming message in block 102.

When the determination, in decision block 108, is that the subscriber is registered, the system proceeds to decision block 114. If the registration has not been updated within some predefined recent time, the subscriber is designated or marked as unregistered as set forth in a block 116. The system thus proceeds to decision block 110 to determine if the subscriber has an active AAS. In the instances where it is determined in block 110 that the called subscriber has an active AAS and is otherwise unreachable, the system proceeds to 118. Block 118 returns the address of the AAS in the ACF or LCF in accordance with the type of request originally received. This action ends this portion of the required action. The LCF or ACF message provided by block 118 is that shown in FIG. 3 from block 62 to block 60.

If the determination, in decision block 114, is that the terminal/subscriber is registered, by having contacted the GK within the TIME TO LIVE, the process continues to block 120 where a default ACF or LCF pertaining to the subscribers present address is returned in the message of FIG. 3.

The calling entity, represented in FIG. 3 by block 60, then sends the SET-UP message either to the indicated AAS or to the subscribers GK as determined in FIG. 8. The remaining procedures to connect to the subscriber directly or to an indicated AAS are clearly defined in FIGS. 4 and 5.

Figure 9:
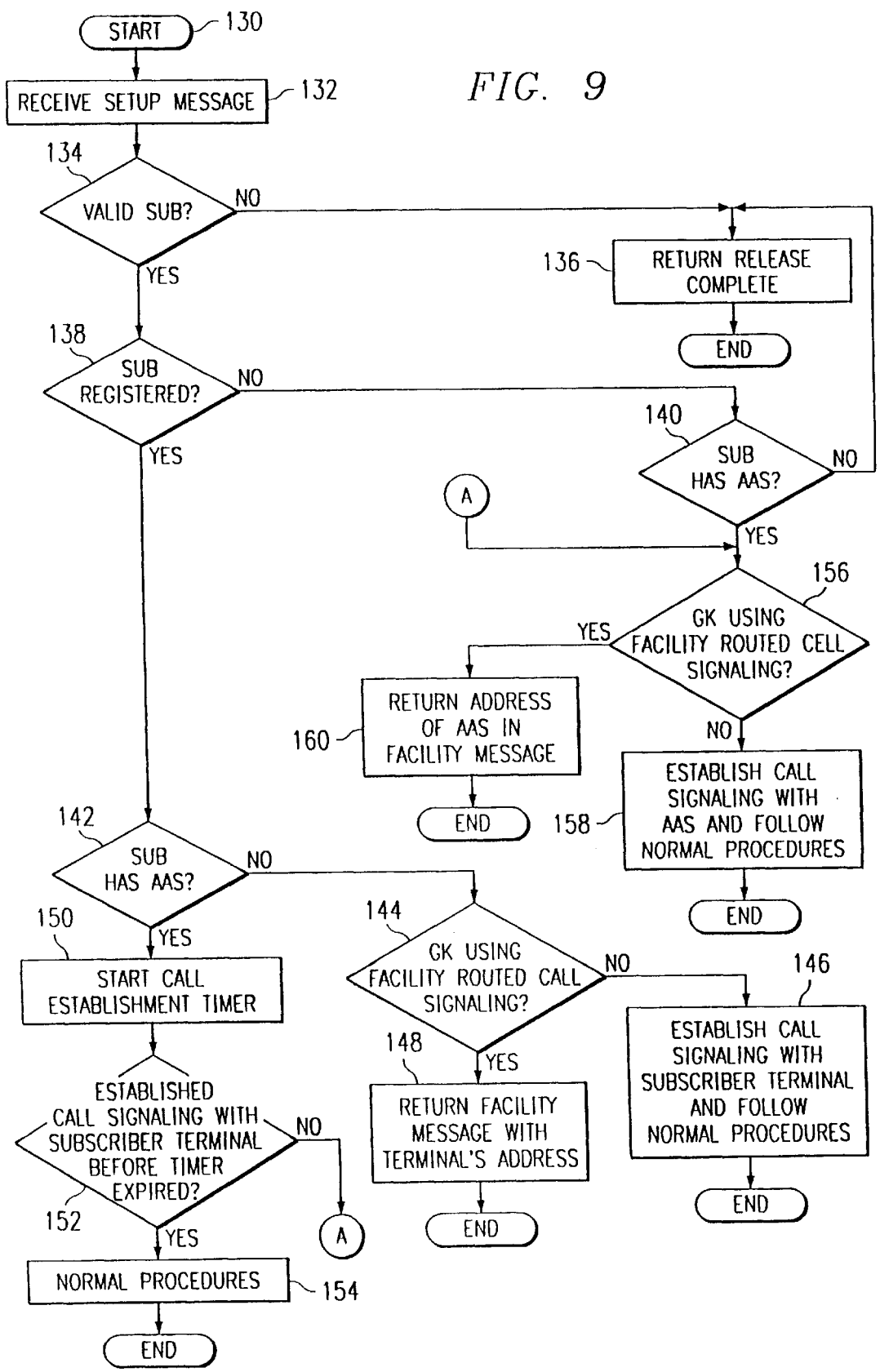
FIG. 9 comprises a flow chart used in further explaining the operation of the invention when call signalling is used in a network.

In FIG. 9 the logical process is presented for the situation where the gatekeeper is processing call signalling including both situations of normal gatekeeper routed call signalling and facility-routed call signalling.

The process starts with block 130 and proceeds to a block 132 for receiving a SET-UP message for a subscriber having a given alias. A decision block 134 makes a determination as to whether or not a subscriber by that alias is assigned to the gatekeeper receiving the SET-UP message. If the determination is NO, the system proceeds to a block 136 and a RELEASE COMPLETE message is returned to the calling party. This ends the process.

When the determination in block 134 is positive, the system proceeds to a decision block 138 to ascertain whether or not the indicated subscriber is presently registered. If the subscriber is not registered, the process goes to a decision block 140 to determine if the indicated subscriber has an AAS. If this determination is NO, the system proceeds to block 136 and a RELEASE COMPLETE message is returned.

A determination that the subscriber is registered in decision block 138 causes the system to proceed to a decision block 142 where a list is checked to see if the subscriber has AAS. If it is determined that the subscriber does not have AAS, the process checks to determine whether or not the GK is using facility-routed call signalling as shown in decision block 144. If the GK does not use facility-routed call signalling, the system proceeds to a block 146 to establish call signalling to the subscribers terminal and, if a connection is established, follows normal call procedures. An example of these procedures is shown in the prior art FIG. 2 in the SET-UP message from GK 54 to EP2 block 52 and subsequent messages.

If it is determined in decision block 144 that the subscriber's GK uses facility-routed signalling, the system proceeds to block 148 where a FACILITY message, including the address of the subscriber's terminal, is returned to the calling party. Such a set of messages is not shown explicitly but would be similar to the returned FACILITY message shown in FIG. 6 except that it would have the subscribers address rather than his AAS. Although not shown in this FIG. 9, block 148 could further indicate that it awaits the receipt of a RELEASE COMPLETE message from the calling party as shown in FIG. 6 before ending the process. Such receipt is not required but is typically provided by the entity receiving a FACILITY message.

When a determination is made in decision block 142 that the subscriber has an AAS, the system starts a call establishment timer as set forth in a block 150. The system then attempts to establish call signalling with the subscriber. In accordance with a decision block 152, if call signalling is established before the timer expires, the system proceeds to a block 154 indicating that normal prior art procedures are followed to maintain the call and to disconnect when the call is completed.

If it is determined in decision block 152, that a connection cannot be established before the timer expires, the system proceeds to a decision block 156. Decision block 156 is also entered from block 140 when it is determined that a subscriber is not presently registered but does have an AAS. A check is made in decision block 156 to determine whether or not the gatekeeper is using facility-routed call signalling. If the GK is not using facility-routed call signalling, the system proceeds to a block 158 where a call is established with the indicated AAS and normal procedures are followed. On the other hand, if it is determined in decision block 156 that the subscriber's GK uses facility-routed signalling, the system proceeds to block 160 where a FACILITY message, including the address of the subscriber's AAS, is returned to the calling party. Such action is shown in FIG. 6. In a manner similar to that explained in connection with block 148, block 160 could further indicate that it awaits the receipt of a RELEASE COMPLETE message from the calling party after the sending of the FACILITY message as shown in FIG. 6 before ending the process.

While other flow diagrams could be presented to show in more detail the logic behind the messages sent in other figures such as FIG. 7, such logic is a simple extension of FIG. 8 and thus apparent from the information already presented.

In summary, the present invention provides an absent addressing service through the intervention of a network entity that processes all calls to a subscriber requesting such service. Since some networks are already configured such that the gatekeeper processes all signalling messages directed to any EP on the network, a subscribers gatekeeper is a convenient entity to be used in providing the intervention capability of the present invention. The intervention entity could be a separate device interacting with the gatekeeper.

As described above, the GK has internally stored the call signalling address of the subscriber's absent addressing service if the subscriber has activated this service. For this process to operate satisfactorily, the subscriber's alias must be considered to permanently exist at the specified gatekeeper. The GK then directs all callers to the subscribers absent addressing service in the event the subscriber's terminal is not registered or is otherwise unreachable. The gatekeeper implements the absent addressing service by returning the call signalling address of the service in the event of a RAS based query, establishes call signalling to the service in the event of gatekeeper directed signalling, or uses facility-routed (sometimes referred to as rerouted) signalling to direct call signalling directly to the service.

A key aspect of the service is quickly detecting that the subscriber is unreachable. Subscribers who have explicitly unregistered (by the H.323 standard unregistration procedures) are not reachable. Unfortunately, the unregistration procedures sometimes fail. Therefore, an audit mechanism must be used to detect the condition of an as yet not unregistered terminal being not reachable. This audit mechanism is achieved by an setting a sufficiently short TIME TO LIVE for the registration. Terminals must re-register within the TIME TO LIVE window or the subscriber associated with a terminal will be deemed unreachable. Unreachability is also established where gatekeeper-directed call signalling is used and call signalling cannot be successfully established between the subscribers gatekeeper and the subscriber terminal.

While the invention has been described using RAS and H.225.0 call signalling message types, the invention will operate in an H.323 compliant way when H.245 signalling is used, as well as when the calling and called party are served by other networks. Examples of such other networks (such as the PSTN or a private PBX network using Q.931) are represented by blocks 26 and 28 in FIG. 1, as long as the called party has subscribed to the absent addressing service and the call is being routed over an H.323 network following the procedures of the invention.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. Gatekeeper apparatus comprising:
   a memory for keeping a list of subscribers and their last registered addresses for which that gatekeeper is responsible;
   a memory for keeping a list of alternate addresses to be used for subscribers who are absent at the time of an incoming communication request; and
   digital processor means for selecting one or more alternate addresses if an associated subscriber is absent at the time of an incoming communication request.

2. The apparatus of claim 1 comprising in addition:
   means for checking to see if a given subscriber is presently registered upon receipt of a communication request for said given subscriber;

means for completing the communication request if said given subscriber is registered; and means for completing the communication request using said alternate address if said given said subscriber is unregistered.

3. A method of servicing subscribers of a network comprising the steps of:

keeping a list of subscribers and their last registered addresses for which that gatekeeper is responsible;

keeping a list of alternate addresses to be used for subscribers who are absent at the time of an incoming communication request;

determining that one of the subscribers for which a communications request is made is unregistered;

selecting one or more addresses from the alternate address list for use in response to the communications request.

4. The method of claim 3 comprising the additional steps of:

checking to see if a given subscriber is presently registered upon receipt of a communication request for said given subscriber;

completing the communication request if said given subscriber is registered; and completing the communication request using said alternate address if said given said subscriber is unregistered.

5. Gatekeeper apparatus comprising:

means for keeping a list of subscribers and their last registered addresses for which that gatekeeper is responsible;

means for keeping a list of alternate addresses to be used for subscribers who are unreachable at the time of an incoming communication request; and means for selecting and address associated with a subscriber when the subscriber is unreachable.

6. A method of servicing subscribers of a packet data network comprising the steps of:

keeping a list of subscribers and their last registered addresses for which that gatekeeper is responsible;

keeping a list of alternate addresses to be used for subscribers who are unreachable at the time of an incoming communication request; and selecting an alternate address associated with a subscriber if the subscriber is unreachable.

7. A method of providing an absent subscriber service to subscribers of a network comprising the steps of:

keeping a list of subscribers and their last registered addresses by a gatekeeper;

keeping a list of alternate addresses by the gatekeeper for use when a subscriber is not registered;

determining whether a set-up message is for the subscriber;

determining whether the subscriber is registered;

responding by a first method if the subscriber is registered; and responding by a second method if the subscriber is not registered.

8. The method of claim 7, wherein the step of determining the set-up message is for the subscriber is performed by intercepting a calling party set-up call to the subscriber.

9. The method of claim 7, wherein the first method comprises returning a current address of the subscriber, and wherein the second method comprises returning an absent addressing address of the subscriber.

10. The method of claim 7, wherein the first method comprises forwarding set-up calls to one or more of the subscribers, and wherein the second method comprises supplying messages to connect a set-up call to an absent addressing service.

11. A method of providing an absent subscriber service to subscribers of a network comprising the steps of:

keeping a list of subscribers and their last registered addresses by a gatekeeper;

keeping a list of alternate addresses by the gatekeeper for use when a subscriber is not registered;

determining whether a set-up message is for the subscriber by receiving a call set-up message comprising at least one of an ARQ, a LRQ, and a SET-UP message, the call set-up message comprising an alias of the subscriber;

determining whether the subscriber is registered;

responding by a first method if the subscriber is registered; and responding by a second method if the subscriber is not registered.

12. An apparatus for providing an absent subscriber service to subscribers of a network comprising the steps of:

gatekeeper means for keeping a list of subscribers and their last registered addresses;

a gatekeeper means for keeping a list of alternate addresses for use when a subscriber is not registered;

a gatekeeper means for determining a set-up message is for the subscriber;

a means for determining whether the subscriber is registered;

a means for responding by a first method if the subscriber is registered; and a means for responding by a second method if the subscriber is not registered.

13. An apparatus for providing an absent subscriber service to subscribers of a network comprising the steps of:

a gatekeeper means for keeping a list of subscribers and their last registered addresses;

a gatekeeper means for keeping a list of alternate addresses for use when a subscriber is not registered;

a gatekeeper means for determining the set-up message is for the subscriber, wherein the means for determining the set-up message is for the subscriber is performed by means for receiving a call set-up message comprising at least one of an ARQ, a LRQ, and a SET-UP message, the call set-up message comprising an alias of the subscriber;

a means for determining whether the subscriber is registered;

a means for responding by a first method if the subscriber is registered; and a means for responding by a second method if the subscriber is not registered.

14. The apparatus of claim 12, wherein the means for determining the set-up message is for the subscriber is performed by intercepting a calling party set-up call to the subscriber.

15. The apparatus of claim 12, Wherein the means for responding by the first method comprises returning a current address of the subscriber, and wherein the means for responding by the second method comprises returning an absent addressing address of the subscriber.

16. The apparatus of claim 12, wherein the means for responding by the first method comprises forwarding set-up calls to one or more of the subscribers, and wherein the means for responding by the second method comprises supplying messages to connect a set-up call to an absent addressing service.

* * * * *